(12) United States Patent
Rosenshine (10) Patent No.: US 11,382,252 B1
(45) Date of Patent: Jul. 12, 2022

(54) HAND OPERATED WEEDING TOOL

(71) Applicant: Howard Rosenshine, Doningtown, PA (US)

(72) Inventor: Howard Rosenshine, Doningtown, PA (US)

(*) Notice: Subject to any disclaimer, the term of this patent is extended or adjusted under 35 U.S.C. 154(b) by 760 days.

(21) Appl. No.: 16/376,127

(22) Filed: Apr. 5, 2019

Related U.S. Application Data

(60) Provisional application No. 62/656,340, filed on Apr. 11, 2018.

(51) Int. Cl.
*A01B 1/16* (2006.01)

(52) U.S. Cl.
CPC .................... *A01B 1/16* (2013.01)

(58) Field of Classification Search
CPC .... A01B 1/00; A01B 1/08; A01B 1/16; B66F 15/00; B66F 3/00
See application file for complete search history.

(56) References Cited

U.S. PATENT DOCUMENTS

| | | | | |
|---|---|---|---|---|
| 1,554,518 A | * | 9/1925 | Ostrander | A01B 1/16 254/132 |
| 1,782,506 A | * | 11/1930 | Henderson | B25C 11/00 254/27 |
| 2,504,746 A | * | 4/1950 | Stecker | A01B 1/20 294/51 |
| 2,556,343 A | * | 6/1951 | Shearer | B25C 11/00 254/27 |
| 3,976,282 A | * | 8/1976 | Baker | B66F 15/00 254/132 |
| 4,630,366 A | * | 12/1986 | Fry | A01B 1/16 294/50.9 |
| 4,815,778 A | * | 3/1989 | Hoch | A01B 1/00 294/55.5 |
| D300,714 S | * | 4/1989 | Skibell | D8/9 |
| 4,832,132 A | * | 5/1989 | Barcelon | A01B 1/16 294/50.5 |
| 5,383,523 A | * | 1/1995 | Stamp | B25G 3/36 30/340 |
| 5,609,325 A | * | 3/1997 | DeArmond | A01B 1/16 254/132 |
| 6,663,082 B1 | * | 12/2003 | Ploeger | B25C 11/00 254/129 |
| 8,366,075 B1 | * | 2/2013 | Provines | B25C 11/00 254/21 |
| 8,517,341 B2 | * | 8/2013 | Edwards | B66F 15/00 254/129 |
| 2004/0065452 A1 | * | 4/2004 | Baker | A01B 1/16 172/378 |
| 2012/0061631 A1 | * | 3/2012 | Edwards | B66F 15/00 254/129 |
| 2016/0120091 A1 | * | 5/2016 | Lawson | A01G 23/062 171/1 |
| 2017/0295712 A1 | * | 10/2017 | LaViano | A01B 1/16 |

* cited by examiner

*Primary Examiner* — Jamie L McGowan (57) ABSTRACT

A handheld weeding tool with a slidably mounted fulcrum which leverages the force of prying a weed from the ground. During use, the fulcrum becomes locked into a working position. In some embodiments a compression spring holds the fulcrum in a fixed position on the weeder's shaft.

7 Claims, 8 Drawing Sheets

HAND OPERATED WEEDING TOOL

TECHNICAL FIELD

The present disclosure relates generally to the field of gardening. Specifically, it relates to the use of hand-operated weeding tools that remove weeds from lawns, gardens, and the like.

BACKGROUND

Removal of unwanted weeds, particularly from lawns and gardens, is a well-known issue. The two currently available solutions involve the use of either an herbicide applied directly to the weed(s) or the use of a non-powered mechanical weed remover.

Weeds, like plants in general, can have a root system consisting primarily of a large, solid central root called a taproot. Roots with a branching root system and no prominent central member are called fibrous roots. The plant species determines whether its root system is central (taproot) or branching (fibrous root).

A weed's roots grow at pace with the plant. The roots can vary greatly in shape, depending on whether they are taproots or fibrous roots.

Permanent manual removal of a weed involves removing all of the weed root as well as the weed itself. If a substantial portion of the root remains after removal, the weed will likely grow back. For that reason, a weed-removing tool should have a plunge depth and angle that effects complete removal of the weed's roots.

A common mechanical weed-removal tool has a shaft with a sharpened V-shaped tip at one end and a handle grip at the opposite end. This type of implement is referred here as hand weeding-tool or weeder.

This weeder is held at the shaft handle and thrust into the soil at its V-shaped tip, close to and pointing toward the weed, at an angle relative to the ground surface. This step is referred to as plunging. After a desired plunge depth is reached, and the weeder tip is either touching or near the weed root. The weed along with the root is pried out of the soil by applying downward torsional force to the handle. This step is referred to as prying.

Some implementations of the above tool include an attached fulcrum for added leverage when prying the weed from the soil. The fulcrum may be permanently attached to a fixed point on the shaft or slidably mounted. These slidable mountings typically use a machine-screw-based clamping mechanism to implement an active locking mechanism, as the user must deliberately engage the locking mechanism after it has been appropriately positioned along the shaft. A passive locking mechanism engages automatically after it has been positioned, with no additional effort on the part of the user.

Additionally, a locking mechanism may be classified as dynamic or static. A dynamic locking mechanism locks the mechanism in place under load, as when the tool is being used during the prying operation. A static locking mechanism locks the mechanism when the tool is at rest and not being used for prying.

This type of classification is not mutually exclusive. A single mechanism may provide both dynamic and static locking.

In this context "bias" refers to a slight positional change along an indicated direction.

SUMMARY

The present invention is a handheld weeding tool with a slidably mounted passively locking fulcrum which leverages the force of prying a weed from the ground. During use, the fulcrum becomes dynamically locked into a working position. In some embodiments the weeder has a static locking mechanism. In one embodiment a static locking mechanism is a compression spring that holds the fulcrum in a fixed position.

In one embodiment, the weeder has a shaft, handle, tip and fulcrum. The shaft has a distal or "tip" end and a proximal "handle" end. The fulcrum is substantially planar and has a proximal end, referred to as the "apex," and a distal end, referred to as its "base." In this embodiment a static locking mechanism is a compression spring that holds the fulcrum in a fixed position by biasing the distal end of the fulcrum towards the handle, holding the fulcrum in a fixed position.

The fulcrum has a center aperture for mounting to the shaft. The diameter of the fulcrum's aperture is slightly larger than the diameter of the shaft, with a tolerance such that the diameter of the shaft and the diameter of the corresponding aperture create a slip-fit to allow the user to freely position the fulcrum along the shaft. A general range for this slip-fit arrangement is several thousandths of an inch difference between the aperture and the shaft's diameter. In some embodiments the aperture is 0.001"-0.01" larger than the shaft diameter.

In one embodiment, the fulcrum locks against the shaft in a dynamic lock. In use, one grips the handle and plunges the tool's tip into the soil at a desired angle and appropriate depth. The user then slides the fulcrum along the shaft toward the tip until the fulcrum is effectively wedged against the soil. As the user begins to pry the weed from the ground, the fulcrum leverages the user's effort into output force on the weed. During that action the transverse force of the prying motion tilts the fulcrum until the fulcrum's base is angled away from the weeder's tip.

The prying motion also serves to lock the fulcrum in place. The transverse force of the prying motion produces friction between the shaft and the fulcrum-aperture, and due to the tight tolerance between shaft and aperture, the edge of the fulcrum's aperture bites into the shaft, holding it longitudinally against the shaft. The prying force keeps the fulcrum locked throughout the prying motion, until the weed is freed from the soil and the prying effort stops. The resulting absence of transverse force causes the fulcrum to become loose against the shaft and thus unlocked. In other words, unless the fulcrum is biased, the aperture of the fulcrum aligns with the shaft in a slip-fit.

In another iteration, the weeder has a shaft, handle, tip, fulcrum and compression spring that holds the fulcrum to the shaft. The compression spring on the tool's shaft coils around the fulcrum to pull it into a static position, locking it onto the shaft. The coil tilts the fulcrum slightly so that the fulcrum's base is angled away from the weeder's tip and held in place.

This iteration might be used when it is not necessary to adjust the angle or position of the fulcrum, such as in the pulling of numerous, similarly sized weeds.

When the fulcrum is perpendicularly positioned on the shaft, its aperture is slip-fit upon the shaft, allowing the fulcrum to move freely. When the fulcrum is tilted, the tight tolerance between shaft and aperture causes the edge of the fulcrum's aperture to bite into the shaft, holding it in place longitudinally against the shaft. In order to reposition the statically locked fulcrum closer to the weeder's tip, the user simply presses the base of the fulcrum to bias it toward the weeder's tip. This overcomes the force exerted by the coil. Then the user may slide the fulcrum to the desired position and release it. To reposition the fulcrum in the reverse direction, the user tilts the apex toward the weeder's tip.

If desired the fulcrum may be temporarily disengaged from the coil at any time during the work of weeding. This can be accomplished by pushing the fulcrum all the way toward the handle (proximal) end of the shaft.

BRIEF DESCRIPTION OF THE DRAWINGS

To assist those of skill in the art in making and using the disclosed invention and associated methods, reference is made to the accompanying figures, wherein.

DESCRIPTION

Figure 1:
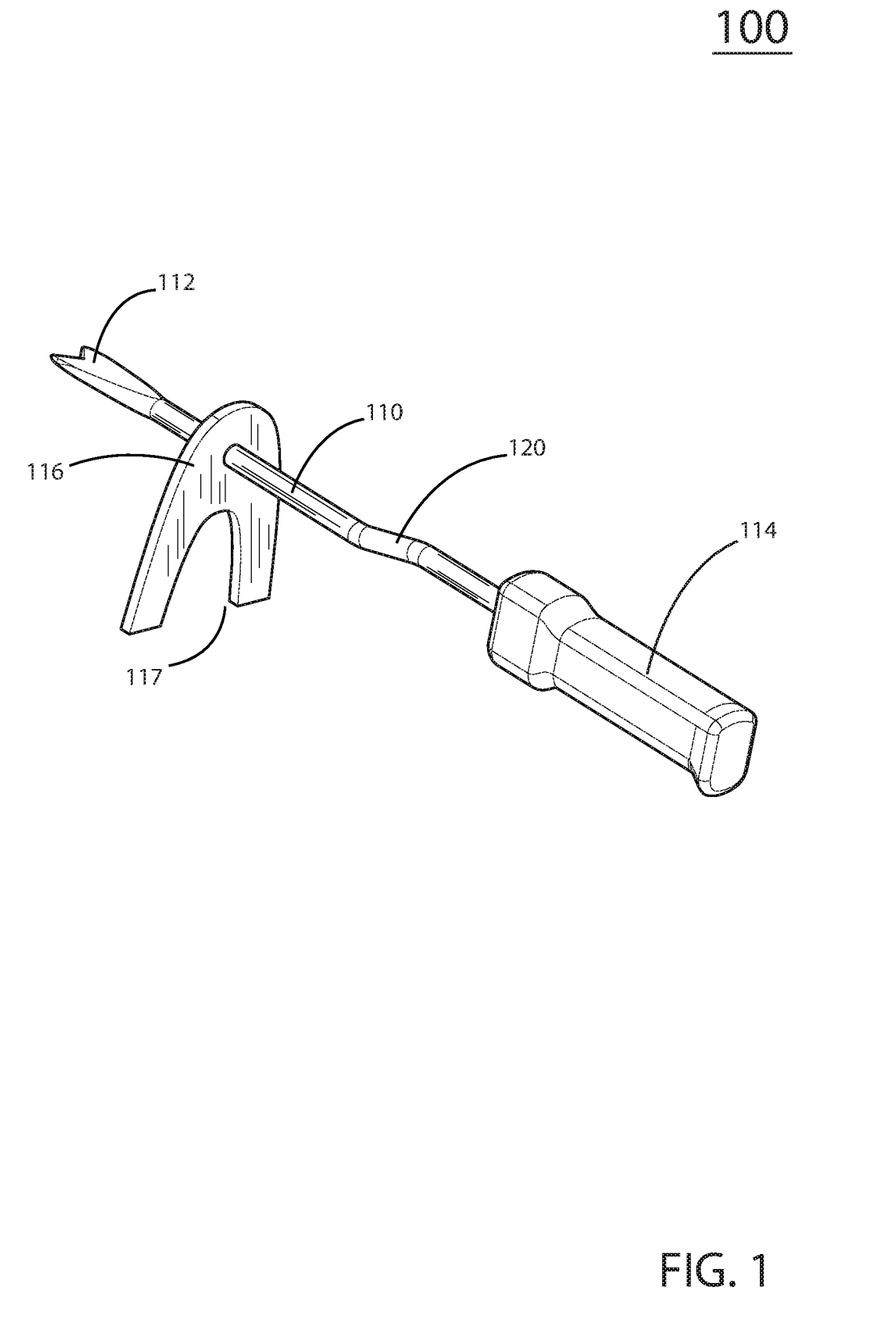
FIG. 1 is a perspective view of the weeder with a slidably mounted fulcrum.

FIG. 1 shows a perspective view of the weeder 100. The body of the weeder consists of a shaft 110, a distal or "tip" end 112, a proximal "handle" end 114, and a fulcrum 116. The shaft 110 is obtusely angled 120.

After the ground has been penetrated to the appropriate depth by the weeder tip 112, the user slides the fulcrum 116 forward until its base 117 touches the soil. Downward force on the handle 114, applied by the user and facilitated by the fulcrum 116, is the effort used to pry the weed from the ground.

Figure 2:
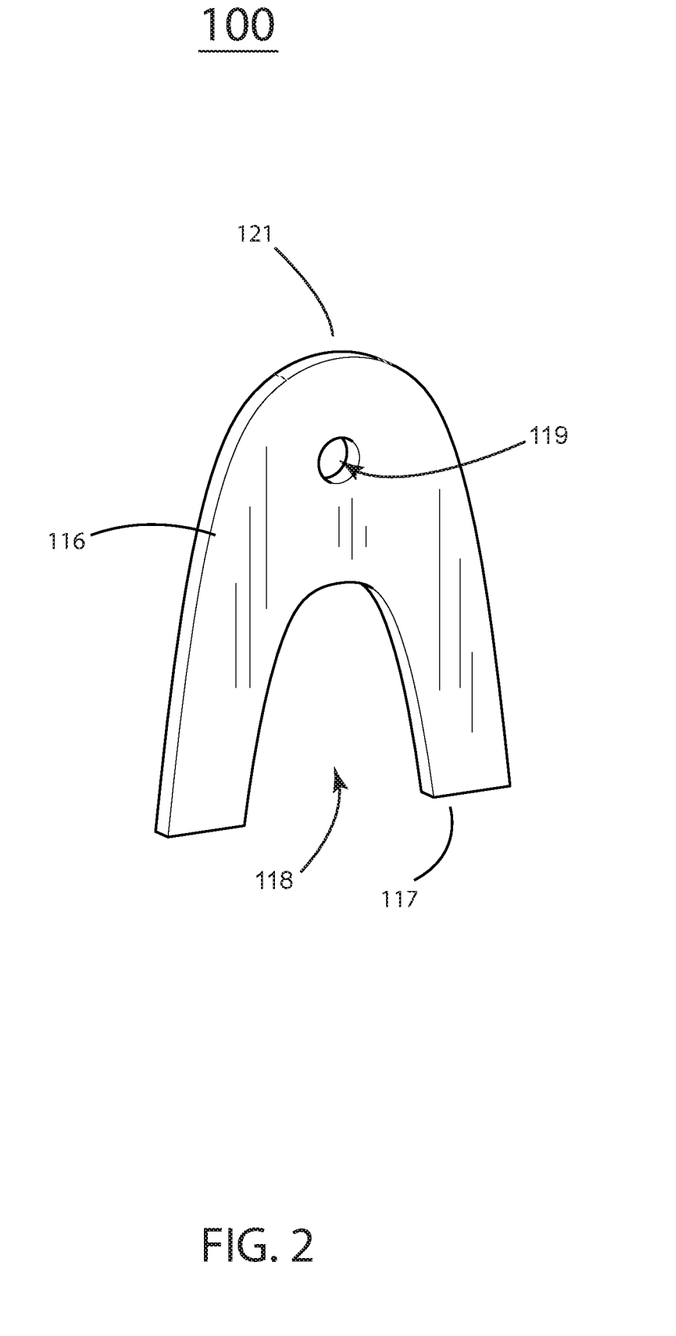
FIG. 2 is a front perspective view of the fulcrum.

In FIG. 2 the fulcrum 116 is a substantially planar, generally arch-shaped form with a proximal end, referred to as the "apex," 121 and a distal end, referred to as the "base" 117. An aperture 119 is cut in the fulcrum, through which the weeder's shaft (FIG. 1, 110) is slip-fitted. An arched-shaped cut (FIG. 2) 118 in the fulcrum's base 117 mitigates contact with obstacles on the ground (such as small stones or twigs) which might cause the base to rest unevenly on the ground.

Figure 3:
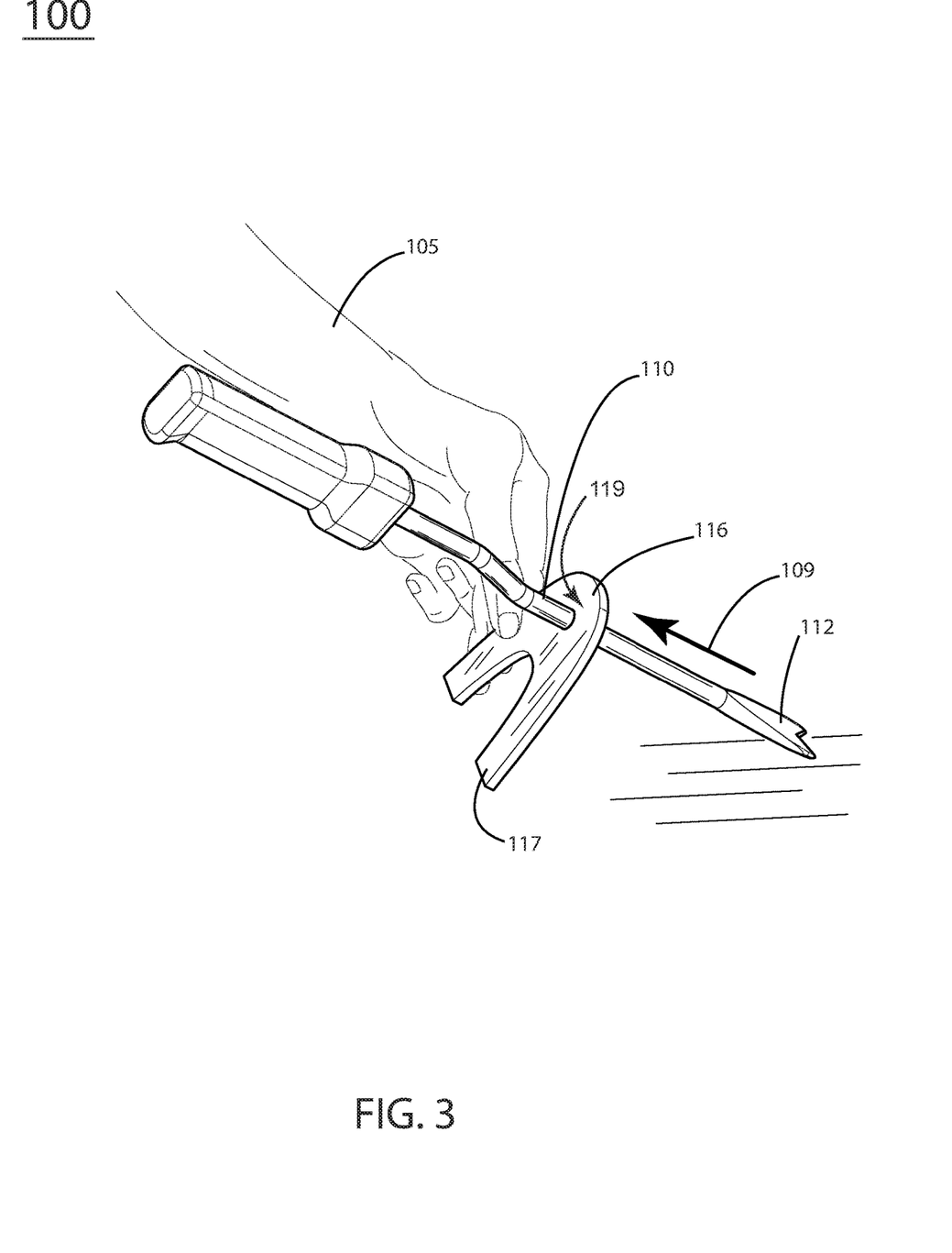
FIG. 3 is a perspective view of the weeder positioned to penetrate the soil at a steep angle.

FIG. 3 shows the weeder 100 positioned to penetrate the soil at a shallow angle to reach a moderate depth, as might be appropriate for a weed with a taproot, such as a dandelion. The fulcrum 116 is moved by the user's hand 105 sliding the fulcrum 116 in the direction indicated by arrow 109, along the shaft 110 to a position relatively distant from the tip 112 of the shaft 110. This frees most of the shaft 110 to penetrate the soil before the base 117 of the fulcrum 116 reaches the soil, at which point the weeder has reached an appropriate depth for leverage enough to remove a weed.

Figure 4:
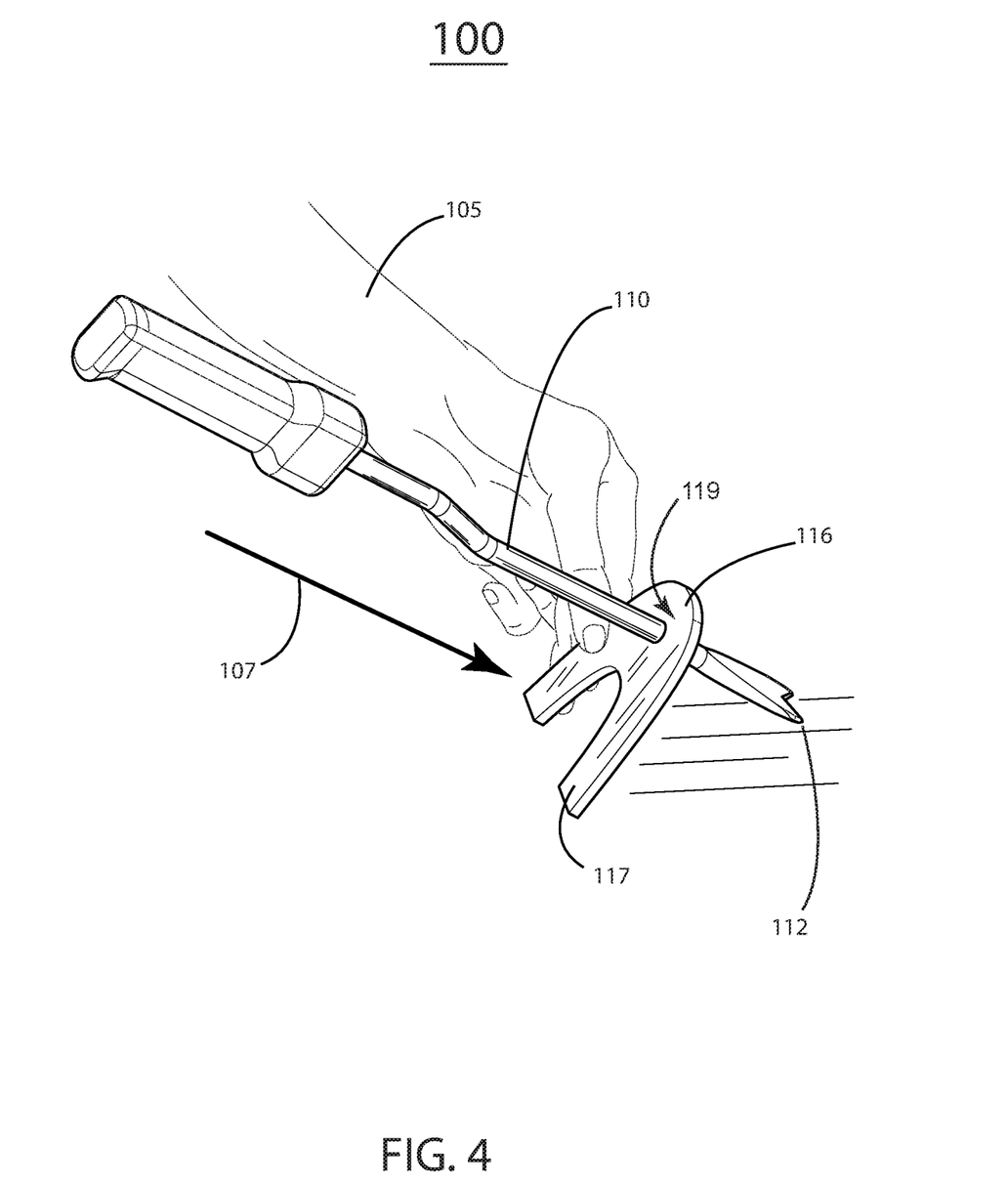
FIG. 4 is a perspective view of the weeder being adjusted.

FIG. 4 shows the weeder 100 positioned to penetrate the soil at a steep angle to reach a shallow depth, as might be appropriate for a fibrous root weed, such as duck grass. The fulcrum 116 is moved by the user's hand 105 by sliding the fulcrum 116 in the direction indicated by arrow 107, along the shaft 110 to a position proximal to the tip 112 of the shaft 110. This leaves less of the shaft 110 to penetrate the soil so that it reaches a shallow depth as the base 117 of the fulcrum 116 rests against the soil for prying.

Figure 5:
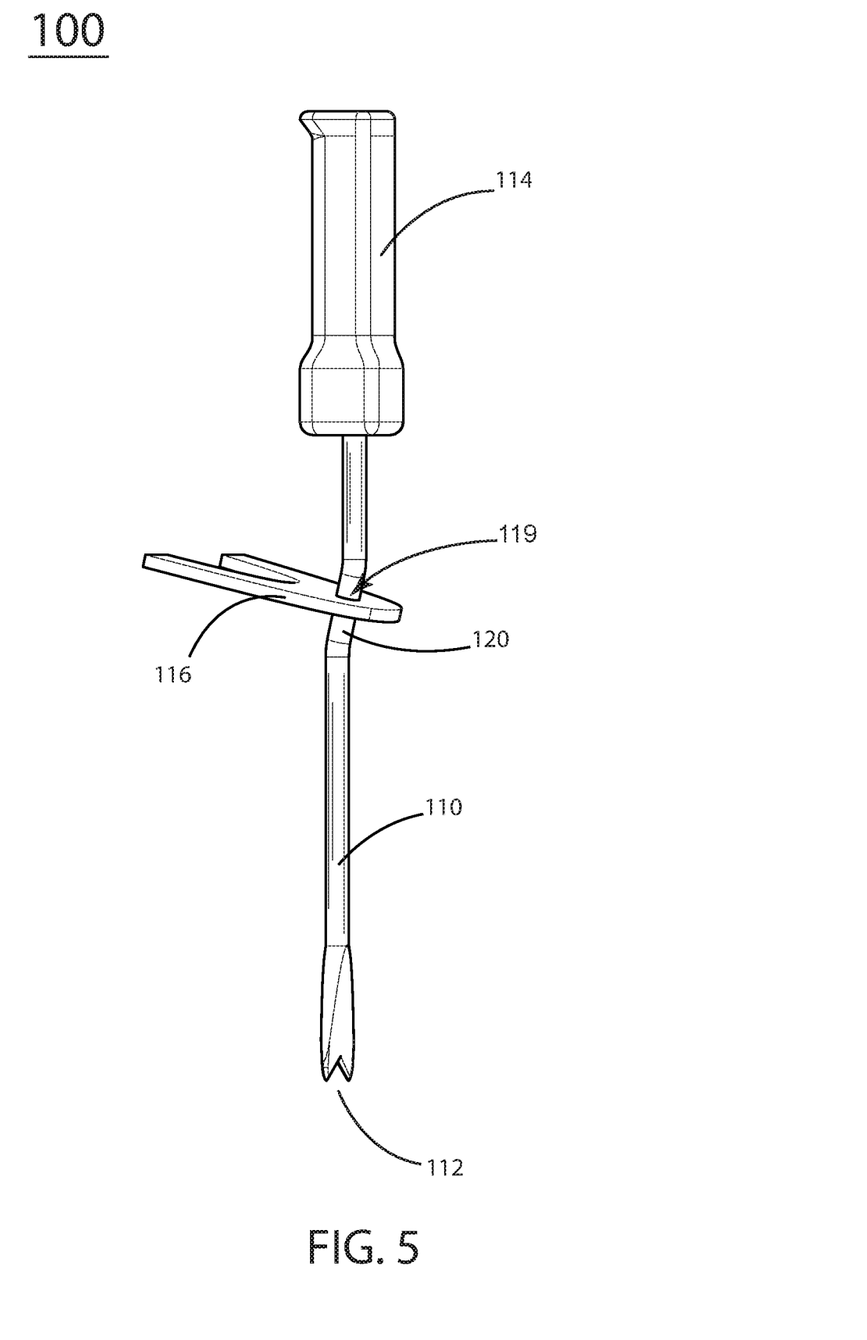
FIG. 5 is a perspective of the weeder with the fulcrum, suspended vertically.

FIG. 5 shows the weeder 100 suspended vertically. One skilled in the art understands that when the fulcrum 116 is angled against the shaft 110, the tight tolerance between the shaft 110 and fulcrum aperture 119 causes part of the edge of the fulcrum's aperture to bite into the shaft and hold the fulcrum against the shaft, and that when the fulcrum 116 is repositioned perpendicular to the shaft 110 the tolerance between the fulcrum's diameter and the shaft's diameter is sufficient to let the fulcrum 116 slide along the shaft 110.

When the user holds the apparatus in a vertical position as shown, and slides the fulcrum 116 behind the bend 120, toward the handle 114, the fulcrum 116 will tend to remain behind the bend 120, regardless of the angle of suspension. Conversely if the fulcrum 116 is placed at the other side of the bend 120, i.e., closer to the tip 112, the fulcrum 116 will tend to slide easily along the shaft 110 between the bend 120 and the tip 112.

Thus the fulcrum 116 can be adjusted as necessary to variously sized weeds.

If one chooses to use the weeder without the fulcrum 116, the fulcrum may be moved out of the way, behind the bend 120 closer to the handle 114. In this position the fulcrum 116 will not slide down the shaft 110 to interfere with the work of weeding.

Figure 6:
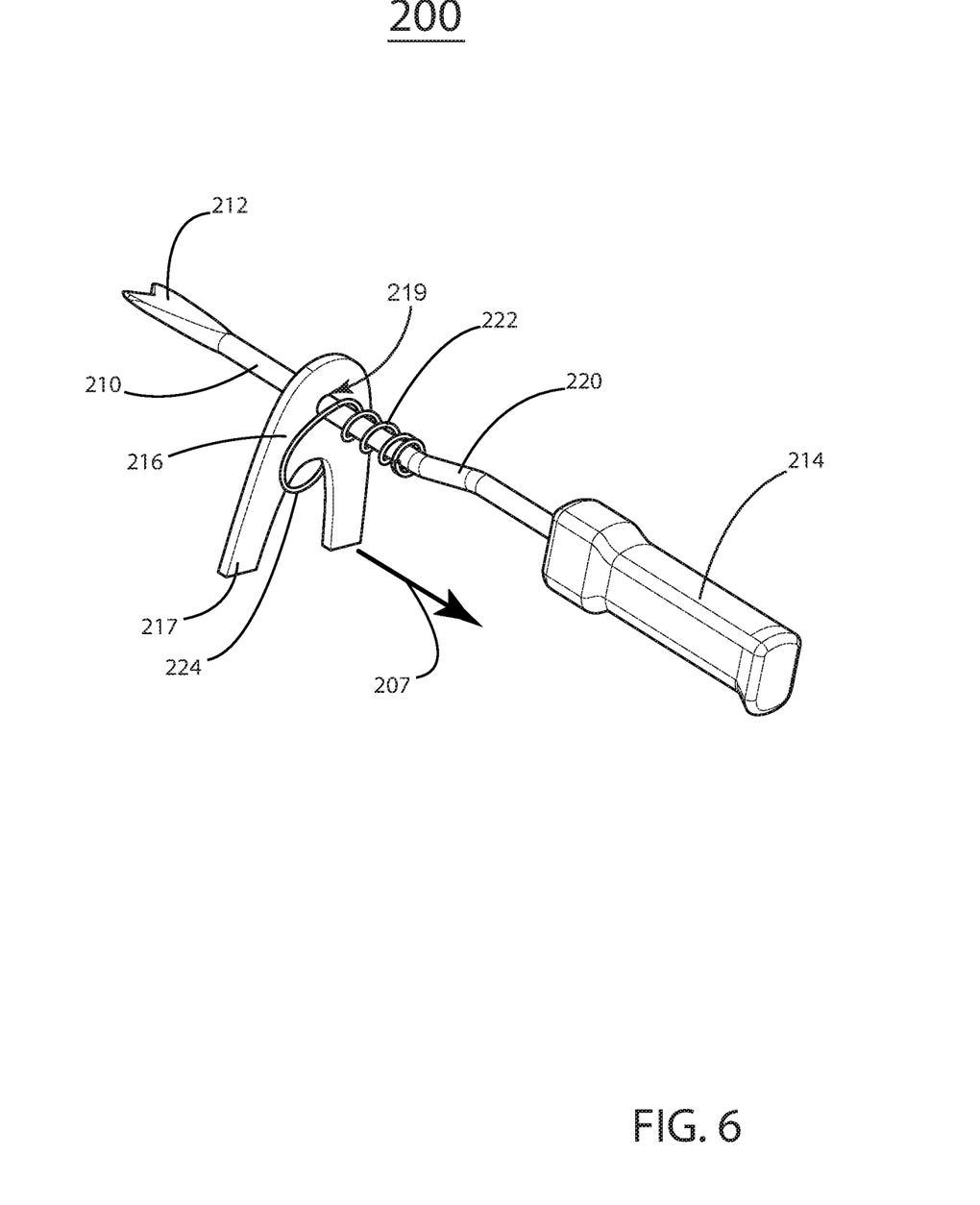
FIG. 6 is a perspective is a perspective view of a second iteration of the weeder.

FIG. 6 is a perspective view of a second iteration of the weeder 200, this one with a compression spring 222 mounted to the shaft 210. The spring 222 is engaged with the fulcrum 216 such that its outermost coil 224 holds the fulcrum in a static position on the shaft 210. The force exerted by the compression spring 222 tilts the fulcrum 216 slightly so that the fulcrum's base 217 is angled away from the weeder's tip 212. The tilt of the fulcrum 216 also creates friction between the aperture 219 and shaft 210, holding the fulcrum 216 in place on the shaft 210.

Figure 7:
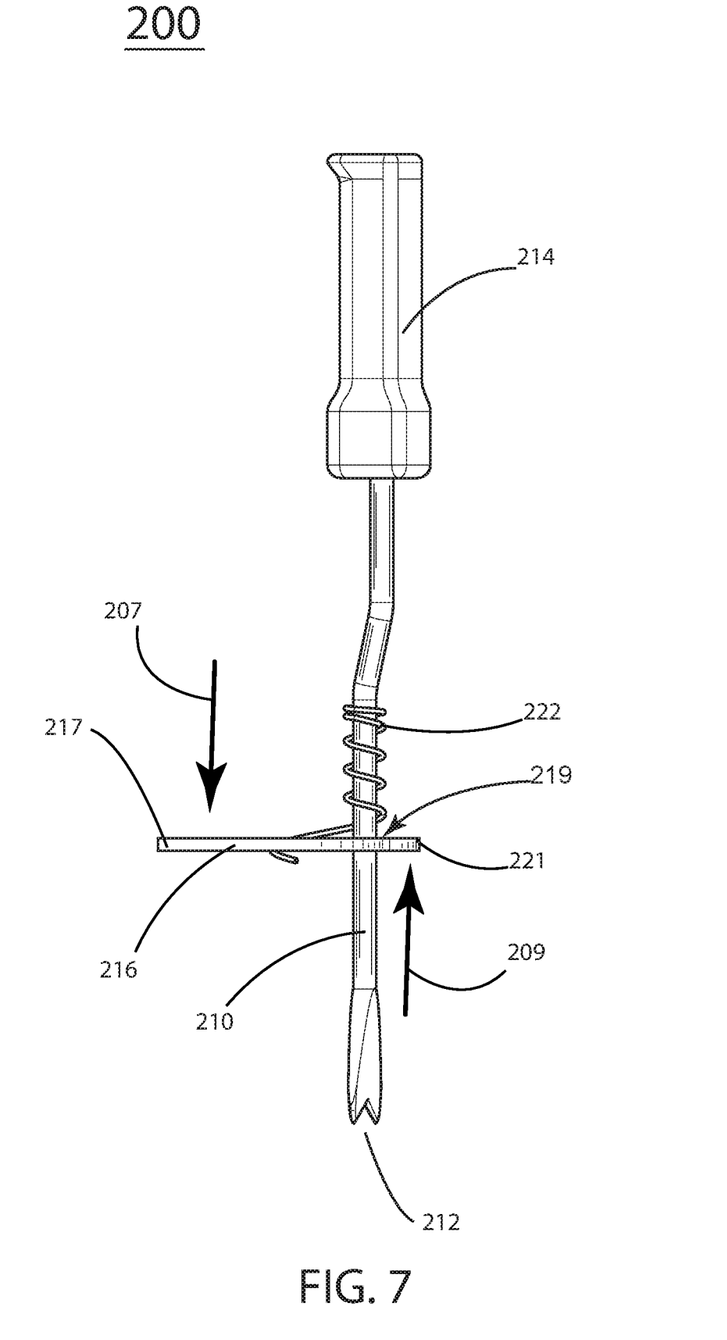
FIG. 7 is a perspective of the weeder 200 suspended vertically by the handle.

FIG. 7 shows the weeder 200 suspended vertically by the handle 214. Without the static hold provided by the compression spring 222, the fulcrum 216 would tend to slide in the direction of arrow 207 toward the tip 212, especially if the weeder were jostled. The slight static locking force (arrow 209) of the compression spring 222 is sufficient to keep the fulcrum 216 in place, regardless of gravity or jostling.

If the user tilts the fulcrum 216 slightly by pushing its base 217 in the direction of the arrow 207 toward the weeder's tip 212, the static locking force of the compression spring 222 would be momentarily lessened so that the fulcrum 116 can be slid to a desired location on the shaft 210. Once the fulcrum 216 is in the new position, the user lets go of the fulcrum's base 217, releasing the tilt, allowing the fulcrum to be held again by the force of the compression spring 222. Conversely, by tilting the fulcrum at the apex 221 in the direction of arrow 209 the user can slide and lock the fulcrum in the opposite direction. Overcoming the force of the compression spring 222 in direction 209 allows for alignment between the aperture 219 and the shaft 210, letting the fulcrum 216 move along the shaft in direction 209.

Figure 8:
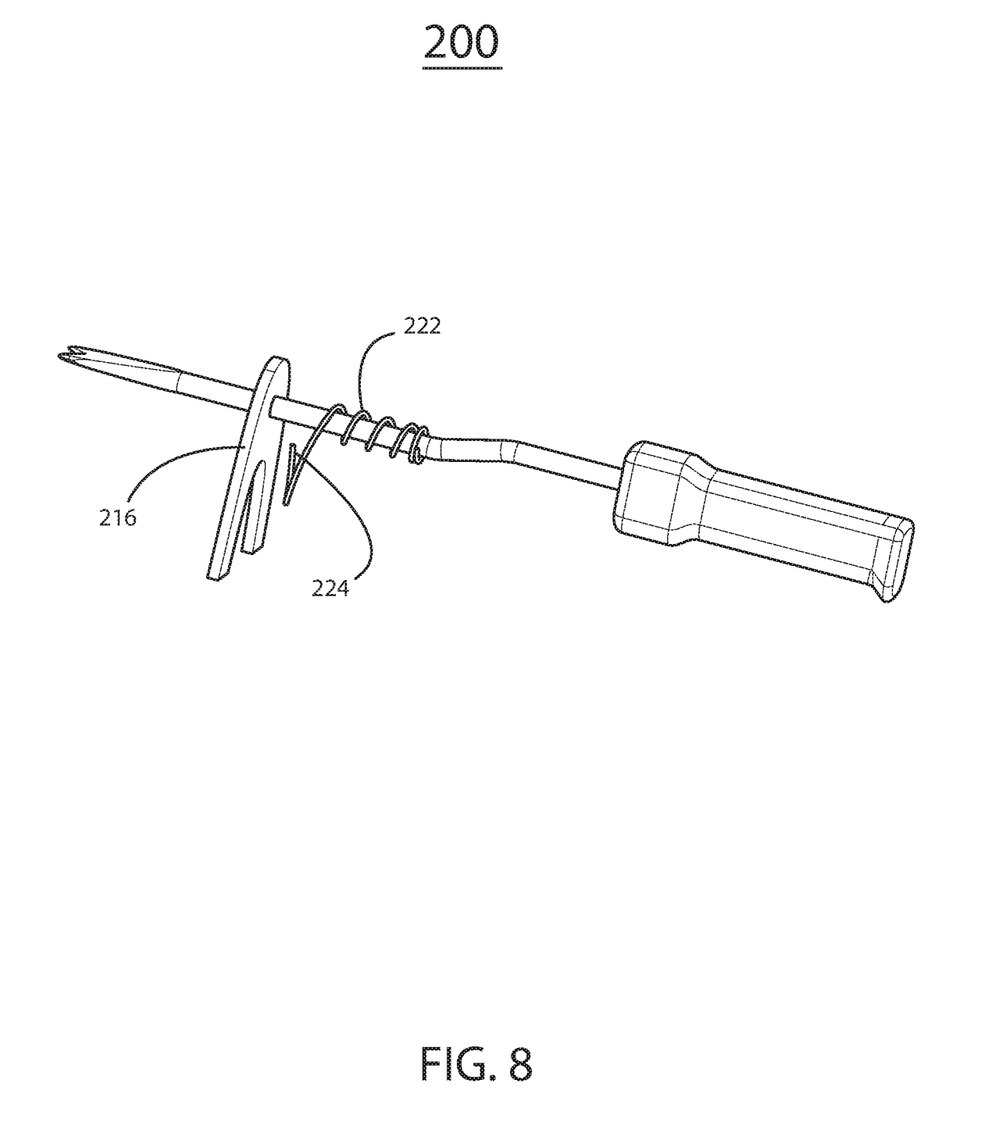
FIG. 8 is a perspective view of the weeder showing a coil of the compression spring disengaged from the fulcrum.

FIG. 8 shows the weeder 200 with a coil 224 of the compression spring 222 disengaged from the fulcrum 216. A user may choose to disengage the spring to use the weeder as presented in FIGS. 1-5.

The invention claimed is:

1. An apparatus for removing weeds comprising:
   a handle; and
   a shaft having a proximal end and a distal end; and
   said shaft proximal end fixedly engaged with said handle; and said shaft distal end having a pronged form; and
a fulcrum
comprising:
    a planar form, being an arched shape; and
    an arched shaped cut in the fulcrum base forming two distal ends at the base of said arch shape; and
    a proximal end of the fulcrum at the apex of the arch shape; and
    an aperture at the proximal end of the fulcrum, slidably engaged with said shaft when coaxial with said shaft and locked when not coaxial; wherein
the fulcrum held coaxial with said shaft is slid along the shaft and the distal ends of the fulcrum are engaged with the ground while the distal end of the shaft is under a weed; downward pressure on said handle provides a prying motion which biases the distal ends of the fulcrum away from the distal end of the shaft, the fulcrum aperture not coaxial, and thereby locked against the shaft during the prying operation and removal of a weed.

2. The apparatus of claim 1 further comprising:
a central axis through the handle; and
a first bend in said shaft proximal to said handle and bending away from said handle central axis; and
a second bend in said shaft proximal to the first bend and inclined at an equivalent angle to said first bend, toward said handle central axis, forming a distal portion of the shaft that is parallel to the handle axis; wherein
moving the fulcrum to the region between said first bend and said second bend holds the fulcrum generally between the bends during use.

3. The apparatus of claim 1 further comprising:
a compression spring coaxial and slidably engaged with said shaft; and
removably engaged with the distal end of said fulcrum; wherein
the spring holds the fulcrum distal end biased toward the proximal end of the shaft and locked against the shaft as the aperture is held not coaxial with the shaft;
overcoming the spring force to rotate the fulcrum such that the aperture is coaxial with the shaft, the fulcrum slides along the shaft.

4. An apparatus for removing weeds comprising:
a handle; and
a shaft having a proximal end and a distal end; and
said shaft proximal end fixedly engaged with said handle; and
said shaft distal end having a pronged form; and
a fulcrum comprising:
    an arch shaped planar form; and
    two distal ends at the base of said arch shape; and
    a proximal end at the apex of said arch shape; and
    an aperture at the proximal end of the fulcrum, slidably engaged with said shaft when coaxial with said shaft and locked against said shaft when not coaxial with said shaft; and
    a spring fixedly engaged with the distal end of said fulcrum; and
    coaxial with, and slidably engaged with, said shaft; wherein
the spring holds the fulcrum distal ends biased toward the proximal end of the shaft and locked against the shaft as the aperture is held not coaxial with the shaft;
overcoming the spring force to rotate the fulcrum such that the aperture is coaxial with the shaft, the fulcrum slides along the shaft, and the distal ends of the fulcrum are engaged with the ground while the distal end of the shaft is under a weed;
downward pressure on said handle provides a prying motion which biases the distal ends of the fulcrum toward the proximal end of the shaft, thereby locking the fulcrum against the shaft during the prying operation and removal of a weed.

5. The apparatus of claim 4 wherein the spring is a compression spring.

6. An apparatus for removing weeds comprising:
a handle having a central axis; and
a shaft having a proximal end and a distal end; and
a first bend in said shaft proximal to said handle and bending away from said handle central axis; and
a second bend in said shaft proximal to the first bend and bending an equivalent angle to said first bend, toward said handle central axis forming a distal portion of the shaft that is parallel to the handle axis
said shaft proximal end fixedly engaged with said handle; and
said shaft distal end having a pronged form; and
a fulcrum
comprising:
    a planar form, being an arched shape; and
    an arched shaped cut in the fulcrum base forming two distal ends at the base of said arch shape; and
    a proximal end of the fulcrum at the apex of the arch shape; and
    an aperture through the proximal end of the fulcrum, slidably engaged with said shaft; wherein said aperture is locked when not coaxial with said shaft; the fulcrum held coaxial with said shaft is slid along the shaft and the distal ends of the fulcrum are engaged with the ground while the distal end of the shaft is under a weed;
downward pressure on said handle provides an offset prying motion which biases the distal ends of the fulcrum away from the distal end of the shaft, the fulcrum aperture not coaxial, and thereby locked against the shaft during the prying operation and removal of a weed.

7. The apparatus of claim 6 wherein said bend in said shaft between about 10°-15°.

* * * * *